United States Patent
Tomoda et al.

(10) Patent No.: US 10,854,222 B2
(45) Date of Patent: Dec. 1, 2020

(54) MAGNETIC RECORDING AND REPRODUCING DEVICE HAVING A MAGNETIC RECORDING HEAD INCLUDING A MAGNETIC FLUX CONTROL LAYER BETWEEN A MAIN MAGNETIC POLE AND AN AUXILIARY MAGNETIC POLE

(71) Applicants: Kabushiki Kaisha Toshiba, Tokyo (JP); Toshiba Electronic Devices & Storage Corporation, Tokyo (JP)

(72) Inventors: Yusuke Tomoda, Kawasaki Kanagawa (JP); Kaori Kimura, Yokohama Kanagawa (JP); Akihiko Takeo, Kokubunji Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/266,166

(22) Filed: Feb. 4, 2019

(65) Prior Publication Data
US 2020/0090683 A1  Mar. 19, 2020

(30) Foreign Application Priority Data
Sep. 18, 2018 (JP) ................. 2018-173566

(51) Int. Cl.
| | |
|---|---|
| G11B 5/187 | (2006.01) |
| G11B 5/09 | (2006.01) |
| G11B 5/60 | (2006.01) |
| G11B 5/255 | (2006.01) |
| G11B 5/31 | (2006.01) |

(52) U.S. Cl.
CPC ............... *G11B 5/09* (2013.01); *G11B 5/187* (2013.01); *G11B 5/255* (2013.01); *G11B 5/3133* (2013.01); *G11B 5/3146* (2013.01); *G11B 5/3153* (2013.01); *G11B 5/6082* (2013.01)

(58) Field of Classification Search
None
See application file for complete search history.

(56) References Cited

U.S. PATENT DOCUMENTS

| | | | |
|---|---|---|---|
| 7,269,889 B2 | 9/2007 | Ueda et al. | |
| 9,165,576 B2 | 10/2015 | Cheng et al. | |
| 9,747,932 B1* | 8/2017 | Taguchi | G11B 5/235 |
| 9,792,935 B2 | 10/2017 | Rejda et al. | |
| 2011/0038081 A1* | 2/2011 | Contreras | G01R 33/1284 360/125.03 |

(Continued)

*Primary Examiner* — Jefferson A Evans
(74) *Attorney, Agent, or Firm* — White & Case LLP

(57) ABSTRACT

According to one embodiment, a magnetic recording and reproducing device includes a magnetic flux control layer provided between a main magnetic pole and an auxiliary magnetic pole, and a protective layer provided on an ABS of the auxiliary magnetic pole. The magnetic flux control layer includes an adjustment layer formed of a magnetic material including one of Fe, Co or Ni and is provided between a first conductive layer and a second conductive layer, and generates a spin torque and inverts a direction of magnetization in the adjustment layer, when current is supplied. A voltage Vb applied to the magnetic flux control layer is lower than a voltage Vba represented by an expression (1), $Vba = Vb_0 - a \times 1/\log(t) \times \log(RH) \times \log(P_{O2})$.

8 Claims, 10 Drawing Sheets

(56) References Cited

U.S. PATENT DOCUMENTS

2014/0063648 A1* 3/2014 Shiroishi ............. G11B 5/3945
                                                    360/75
2016/0275970 A1* 9/2016 Sasaki .................. G11B 5/3116
2017/0047084 A1* 2/2017 Funayama ............. G11B 5/112
2018/0144768 A1* 5/2018 Liu ....................... G11B 5/315
2020/0176020 A1* 6/2020 Matsumoto ............ G11B 5/012

* cited by examiner

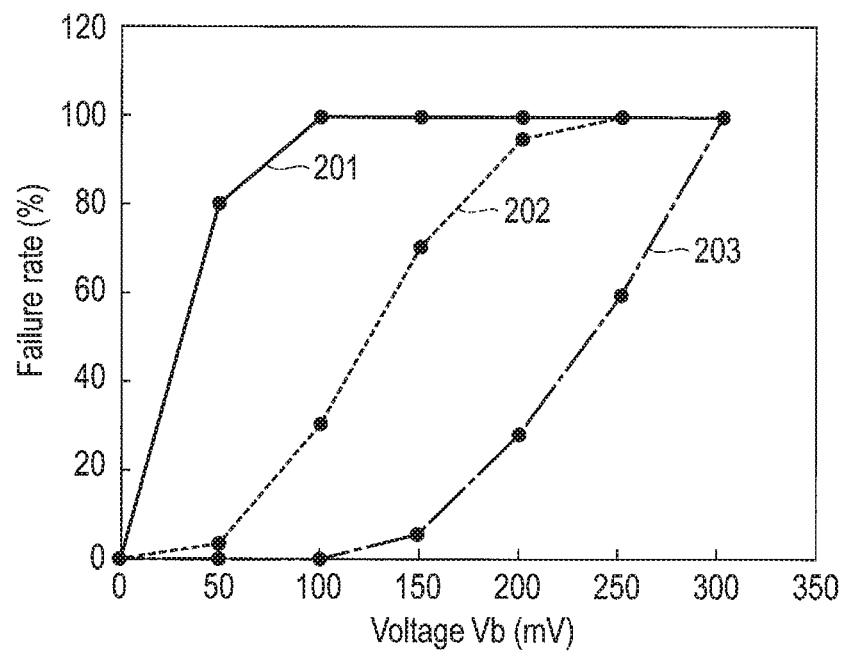
F I G. 9
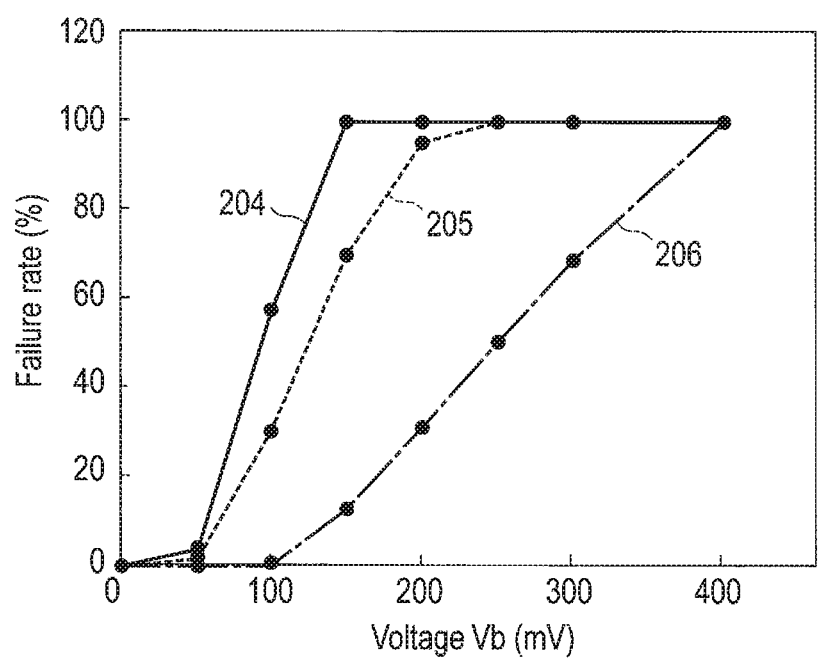
F I G. 10

MAGNETIC RECORDING AND REPRODUCING DEVICE HAVING A MAGNETIC RECORDING HEAD INCLUDING A MAGNETIC FLUX CONTROL LAYER BETWEEN A MAIN MAGNETIC POLE AND AN AUXILIARY MAGNETIC POLE

CROSS-REFERENCE TO RELATED APPLICATIONS

This application is based upon and claims the benefit of priority from Japanese Patent Application No. 2018-173566, filed Sep. 18, 2018, the entire contents of which are incorporated herein by reference.

FIELD

Embodiments described herein relate generally to a magnetic recording and reproducing device.

BACKGROUND

In an assisted magnetic recording head comprising a magnetic flux control layer (spin torque assist element), recording can be performed on a medium on which recording cannot be performed by a conventional head by controlling the magnetic field of a write gap and increasing the intensity of a magnetic field applied to the medium. In the recording method using the assisted magnetic recording head, to produce an assist effect, it is necessary to supply current to the magnetic flux control layer. However, when current is supplied, the magnetic flux control layer generates heat. As a result, oxygen atoms remaining in the magnetic recording and reproducing device and a magnetic material which is the main component of the magnetic flux control layer are bound together, and an oxide magnetic material is formed. This causes problems such as loss of magnetization and reduction of the assist effect. Further, when the magnetic flux control layer is bonded to oxygen, since the volume increases by the volume of the bonded oxygen, the magnetic flux control layer expands and projects from an air bearing surface (ABS), and the risk for a head disk interface (HDI) increases.

BRIEF DESCRIPTION OF THE DRAWINGS

FIG. 9 is a graph showing the relationship between a voltage and a failure rate when the thickness of a protective layer is changed.

FIG. 10 is a graph showing the relationship between an applied voltage and a failure rate.

DETAILED DESCRIPTION

Figure 1:
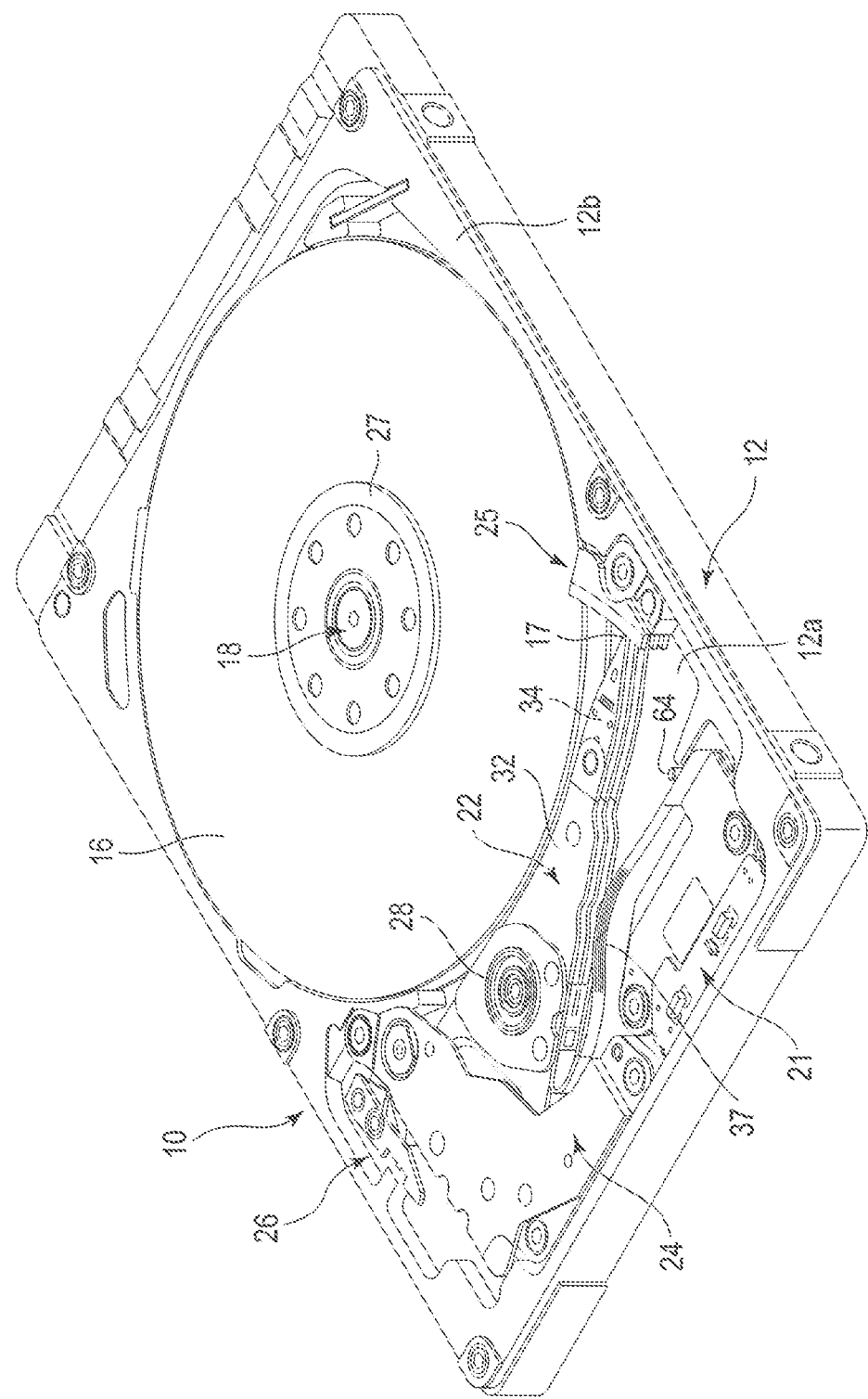
FIG. 1 is a perspective view showing a hard disk drive (hereinafter referred to as an HDD) according to an embodiment.

In general, according to one embodiment, a magnetic recording and reproducing device comprises a rotatable disk-shaped recording medium which includes a magnetic recording layer, and a magnetic recording head which records information on the recording medium.

The magnetic recording head comprises an air bearing surface, a main magnetic pole which has a distal end portion extending to the air bearing surface and generates a perpendicular recording magnetic field, an auxiliary magnetic pole which faces the distal end portion of the main magnetic pole across a write gap and constitutes a magnetic core with the main magnetic pole, a magnetic flux control layer which includes a first conductive layer provided on the main magnetic pole, an adjustment layer provided on the first conductive layer and formed of a magnetic material comprising one of iron, cobalt or nickel, and a second conductive layer electrically connecting the adjustment layer and the auxiliary magnetic pole, and generates a spin torque and inverts a direction of magnetization in the adjustment layer, when current is supplied, and a protective layer which is provided on the air bearing surfaces of the main magnetic pole, the magnetic flux control layer and the auxiliary magnetic pole.

A voltage Vb applied to the magnetic control layer is lower than a voltage Vba represented by an expression (1), $Vba = Vb_0 - a \times 1/\log(t) \times \log(RH) \times \log(P_{O2})$ where $Vb_0$ is a maximum voltage applicable to the magnetic flux control layer, t is a thickness (nm) of the protective layer, RH is a relative humidity of an atmosphere in the device, $P_{O2}$ is an oxygen partial pressure (Pa) of the atmosphere in the device, and a is a coefficient of the device.

As the magnetic recording and reproducing device according to the embodiment, a disk device will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

Figure 2:
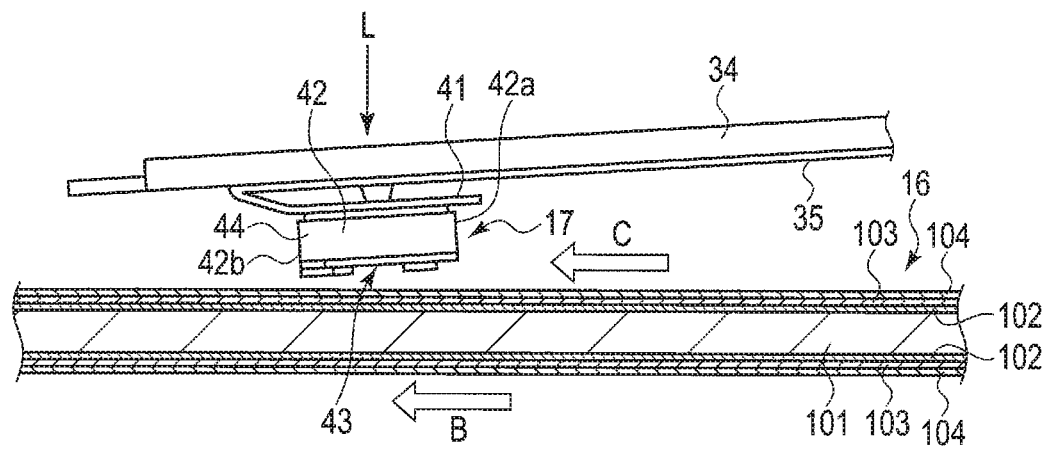
FIG. 2 is a side view showing a magnetic head and a suspension of the HDD of FIG. 1.

FIG. 1 shows the inner structure of a hard disk drive (HDD) according to the embodiment with its top cover removed, as the disk drive, and FIG. 2 shows a magnetic head in a flying state. As shown in FIG. 1, the HDD comprises a housing 10. The housing 10 comprises a base 12 which has the shape of a rectangular box whose top is open, and a top cover (not shown) which is secured to the base 12 with a plurality of screws and closes the top opening of the base 12. The base 12 comprises a rectangular bottom wall 12a and side walls 12b which stand along the peripheral edges of the bottom wall. The top cover is secured to the base 12 with a plurality of screws and closes the top opening of the base 12.

The housing 10 accommodates, for example, two magnetic disks 16 as recoding media and a spindle motor 18 as a driver which supports and rotates the magnetic disks 16. The spindle motor 18 is provided on the bottom wall 12a. Each magnetic disk 16 comprises magnetic recording layers on upper and lower surfaces thereof. The magnetic disks 16 are coaxially engaged with a hub (not shown) of the spindle motor 18, and are clamped by a clamp spring 27 and are thereby secured to the hub. As a result, the magnetic disks 16 are supported parallel to the bottom wall 12a of the base 12. The magnetic disks 16 are rotated at predetermined speed by the spindle motor 18.

The housing 10 accommodates a plurality of magnetic heads 17 which record information on and reproduce information from the magnetic disks 16, and a carriage assembly 22 which supports these magnetic heads 17 movably with respect to the magnetic disks 16. The housing 10 further accommodates a voice coil motor (hereinafter referred to as a VCM) 24 which rotates and positions the carriage assembly 22, a ramp load mechanism 25 which holds the magnetic heads 17 at an unload position separated from the magnetic disks 16 when the magnetic heads 17 move to the outermost peripheries of the magnetic disks 16, a latch mechanism 26 which holds the carriage assembly 22 at a retreat position when an impact or the like is applied to the HDD, and a flexible printed circuit (FPC) unit 21 which is provided with an electronic component such as a conversion connector.

A control circuit board (not shown) is screwed to the outer surface of the base 12 and is located so as to face the bottom wall 12a. The control circuit board controls the operation of the spindle motor 18 and also controls the operation of the VCM 24 and the operation of the magnetic heads 17 via the FPC unit 12.

The carriage assembly 22 comprises a bearing 28 which is secured to the bottom wall 12a of the base 12, a plurality of arms 32 which extend from the bearing 28, and a plurality of suspensions 34 which have the shape of an elastically deformable, long and thin plate. The suspensions 34 are secured to the distal ends of the arms 32 by spot welding or adhesion at proximal ends thereof and extend from the arms 32, respectively. The magnetic heads 17 are supported on the extending ends of the suspensions 34, respectively. The suspensions 34 and the magnetic heads 17 face each other with the magnetic disks 16 sandwiched between the suspensions 34 and the magnetic heads 17.

As shown in FIG. 2, each magnetic head 17 is constituted as a flying head, and comprises a slider 42 which has the shape of a substantially rectangular parallelepiped and a head portion 44 for recording and reproduction which is provided at the outflow end (trailing end) of the slider 42. Each magnetic head 17 is secured to a gimbal spring 41 provided in the distal end portion of the suspension 34. A head load L toward the surface of the magnetic disk 16 is applied to each magnetic head 17 by the elasticity of the suspension 34. As shown in FIGS. 1 and 2, each magnetic head 17 is electrically connected to the FPC unit 21 via a wiring member 35 secured to the suspension 34 and the arm 32, and a relay FPC 37.

Figure 3:
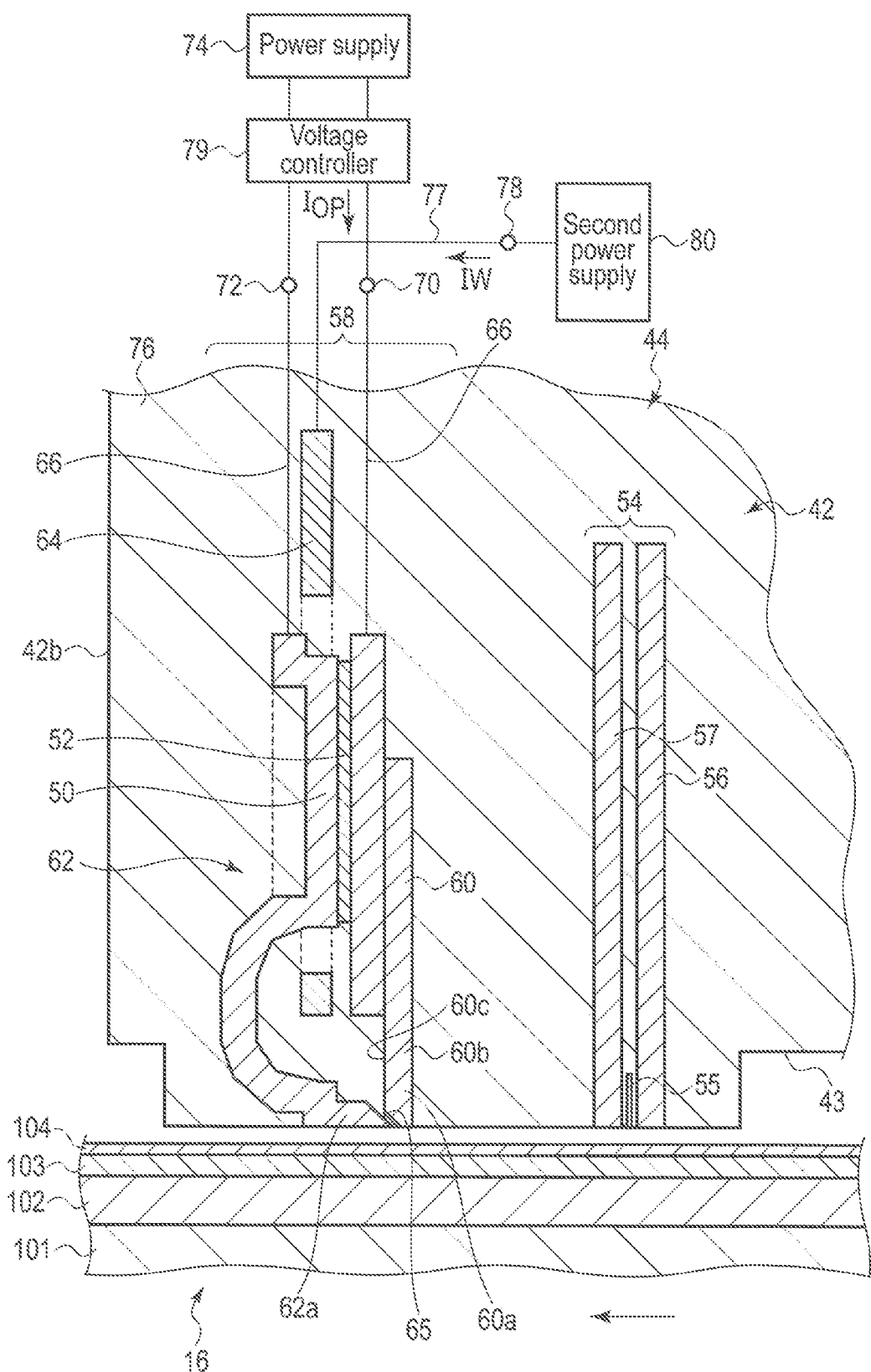
FIG. 3 is an enlarged sectional view showing a head portion of the magnetic head of FIG. 2.

Next, the structure of the magnetic disks 16 and the structure of the magnetic heads 17 will be described in detail. FIG. 3 is an enlarged sectional view showing the head portion 44 of the magnetic head 17 and the magnetic disk 16.

As shown in FIGS. 1 to 3, the magnetic disk 16 comprises a substrate 101 which is formed of a nonmagnetic material and has the shape of a disk having a diameter of about 2.5 inches (6.35 cm). A soft magnetic layer 102 formed of a material showing soft magnetic properties as an underlayer, a magnetic recording layer 103 having magnetic anisotropy in a direction perpendicular to a disk surface on the top of the layer, and a protective layer 104 on the top of the layer are stacked in order on each of the surfaces of the substrate 101.

As shown in FIGS. 2 and 3, the slider 42 of the magnetic head 17 is formed of, for example, a sintered body of alumina and titanium carbide (AlTiC), and the head portion 44 is formed by stacking thin films. The slider 42 has a disk-facing surface (air bearing surface (ABS)) 43 which is rectangular and faces the surface of the magnetic disk 16. The slider 42 is floated by an airflow C which is generated between the disk surface and the ABS 43 by the rotation of the magnetic disk 16. The direction of the airflow C conforms to a rotation direction B of the magnetic disk 16. The slider 42 is arranged such that the longitudinal direction of the ABS 43 substantially conforms to the direction of the airflow C with respect to the surface of the magnetic disk 16.

The slider 42 comprises a leading end 42a located on the inflow side of the airflow C and a trailing end 42b located on the outflow side of the airflow C. A leading step, a trailing step, a side step, a negative pressure cavity and the like (not shown) are formed on the ABS 43 of the slider 42.

As shown in FIG. 3, the head portion 44 comprises a reproducing head 54 and a recording head (magnetic recording head) 58 which are formed by a thin-film process at the trailing end 42b of the slider 42, and is formed as a separate type magnetic head. The reproducing head 54 and the recording head 58 are covered with a protective insulating film 76 except for portions thereof which are exposed at the ABS 43 of the slider 42. The protective insulating film 76 forms the outer shape of the heat portion 44.

The reproducing head 54 is composed of a magnetic film 55 which produces a magnetoresistive effect, and shield films 56 and 57 which are arranged on the trailing side and leading side of the magnetic film 55 such that the magnetic film 55 is sandwiched between the shield films 56 and 57. The lower ends of the magnetic film 55 and the shield films 56 and 57 are exposed at the ABS 43 of the slider 42. The recording head 58 is provided on the trailing end 42b side of the slider 42 with respect to the reproducing head 54.

Figure 4:
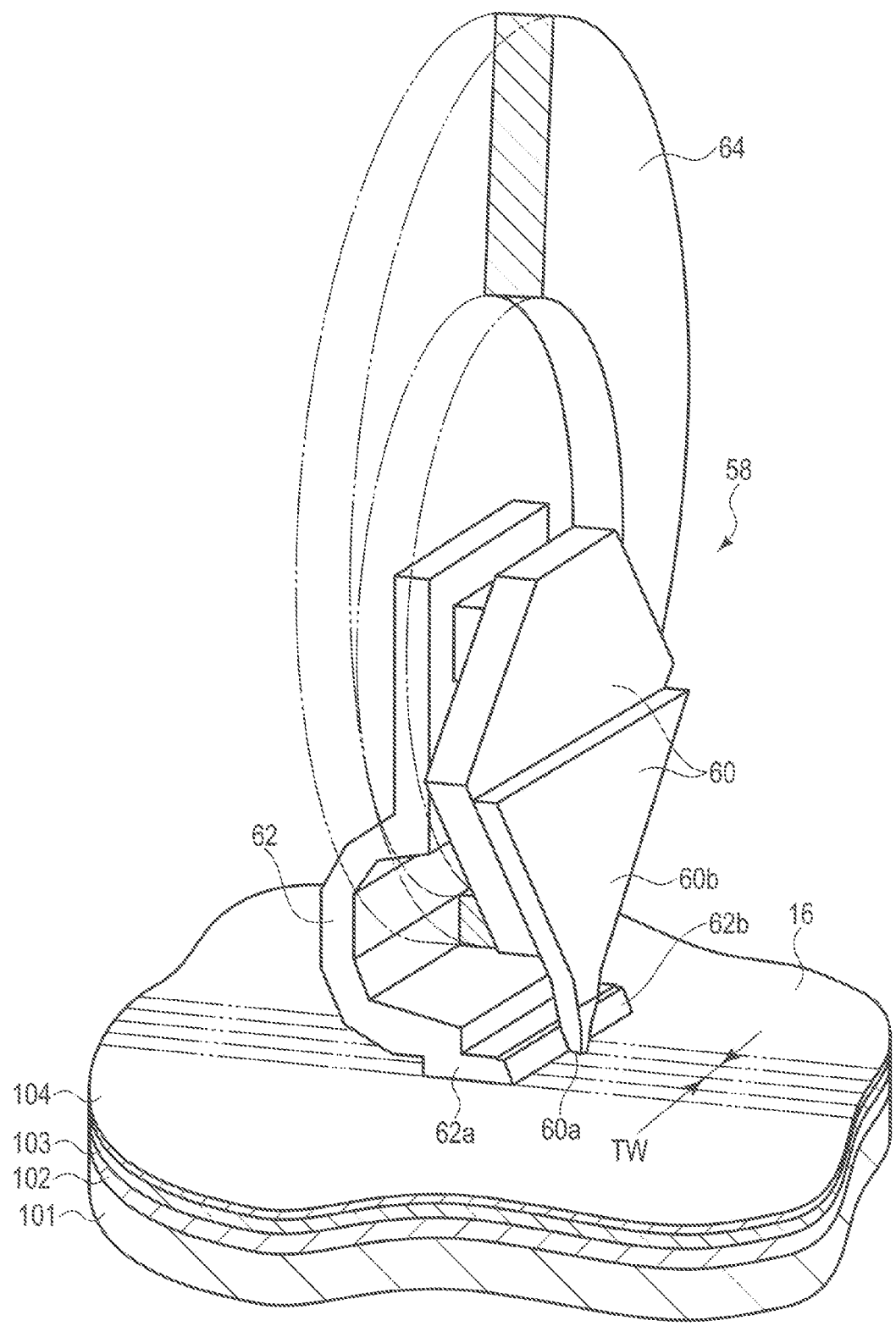
FIG. 4 is a perspective view schematically showing a recording head of the magnetic head of FIG. 3.
Figure 5:
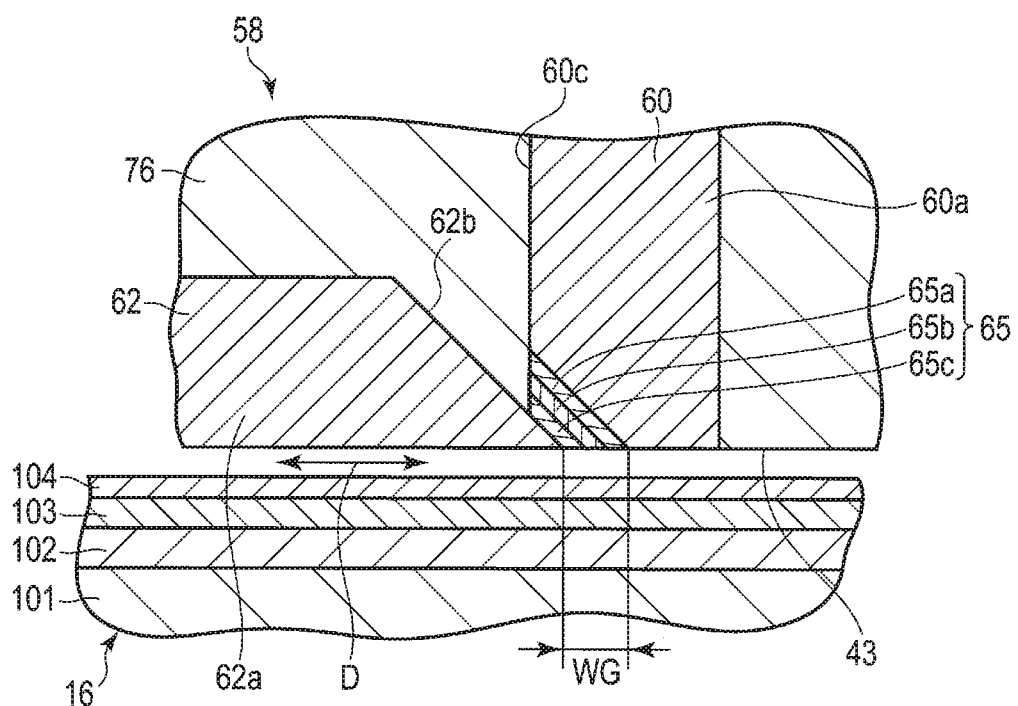
FIG. 5 is an enlarged sectional view of an ABS side end portion of the recording head of FIG. 3 taken along a track center.
Figure 6:
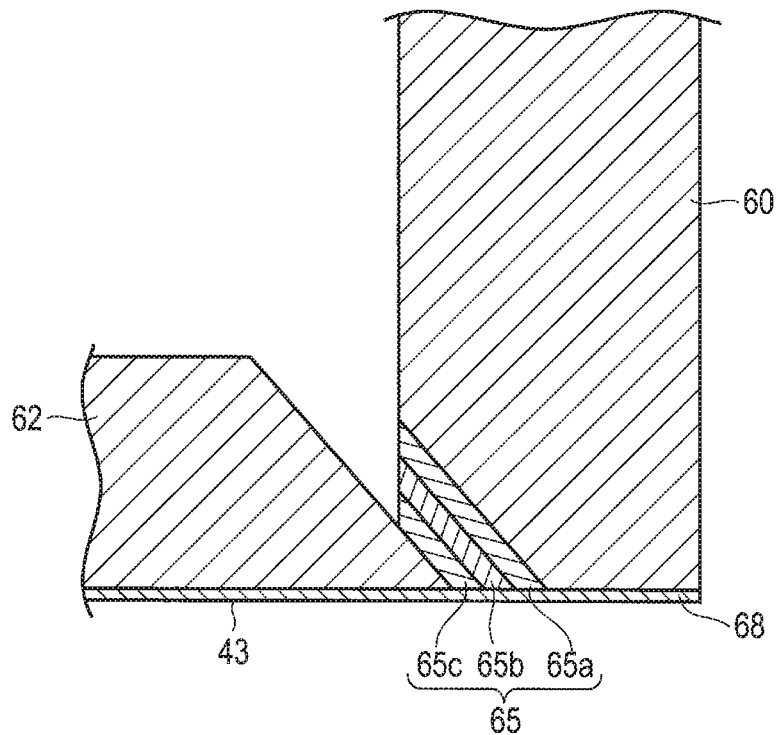
FIG. 6 is an enlarged sectional view showing a part of the magnetic head of FIG. 5.

FIG. 4 is a perspective view schematically showing the recording head 58 and the magnetic disk 16, and FIG. 5 is an enlarged sectional view of an end portion of the recording head 58 on the magnetic disk 16 side taken along a track center. FIG. 6 is an enlarged sectional view of a part of the recording head 58 of FIG. 5.

As shown in FIGS. 3 to 5, the recording head 58 comprises a main magnetic pole 60 which is formed of a high saturation magnetization material and generates a recording magnetic field in a direction perpendicular to the surface of the magnetic disk 16, a trailing shield (auxiliary magnetic pole) 62 which is formed of a soft magnetic material, is arranged on the trailing side of the main magnetic pole 60 and is provided for effectively closing a magnetic path via a soft magnetic layer 102 immediately under the main magnetic pole 60, a recording coil 64 which is arranged so as to wind around a magnetic core (magnetic circuit) including the main magnetic pole 60 and the trailing shield 62 to flow a magnetic flux to the main magnetic pole 60 when a signal is written to the magnetic disk 16, and a magnetic flux control layer 65 which is arranged between a distal end portion 60a of the main magnetic pole 60 on the ABS 43 side and the trailing shield 62 and is arranged so as to be flush with the ABS 43.

The main magnetic pole 60 formed of a soft magnetic material extends substantially perpendicularly to the surface of the magnetic disk 16 and the ABS 43. The lower end portion of the main magnetic pole 60 on the ABS 43 side has a narrow portion 60b which tapers down toward the ABS 43 and narrows down in the form of a funnel in a track width direction, and the distal end portion 60a which has a predetermined width and extends from the narrow portion 60b toward the magnetic disk. The tip of the distal end portion 60a, that is, the lower end of the distal end portion 60a is exposed at the ABS 43 of the magnetic head. The width of the distal end portion 60a in the track width direction substantially corresponds to a width TW of tracks in the magnetic disk 16. Further, the main magnetic pole 60 has a shield side end surface 60c which extends substantially perpendicularly to the ABS 43 and faces the trailing side. For example, an end portion of the shield side end surface 60c on the ABS 43 side obliquely extends toward the shield side (trailing side) with respect to the ABS 43.

The trailing shield 62 formed of a soft magnetic material has a substantially L-shape. The trailing shield 62 comprises a distal end portion 62a which faces the distal end portion 60a of the main magnetic pole 60 across a write gap WG, and a connecting portion (back gap portion) 50 which is separated from the ABS 43 and is connected to the main magnetic pole 60. The connecting portion 50 is connected to the upper portion of the main magnetic pole 60, that is, the upper portion which is away from the ABS 43 to the back side or to the upper side via a nonconductive material 52.

The distal end portion 62a of the trailing shield 62 has the shape of a long and thin rectangle. The lower end surface of the trailing shield 62 is exposed at the ABS 43 of the slider 42. A leading side end surface (main magnetic pole side end surface) 62b of the distal end portion 62a extends in the width direction of the tracks of the magnetic disk 16 and is slanted toward the trailing side with respected to the ABS 43. The leading side end surface 62b faces the shield side end surface 60c of the main magnetic pole 60 substantially in parallel across the write gap WG in the lower end portion of the main magnetic pole 60 (a part of the distal end portion 60a and a part of the narrow portion 60b).

As shown in FIG. 5, the magnetic flux control layer 65 has the function of preventing the flow of a magnetic flux from the main magnetic pole 60 to the trailing shield 62 exclusively, that is, the function of oscillating a spin torque such that the magnetic permeability of the write gap WG becomes negative in effect.

More specifically, the magnetic flux control layer 65 comprises an intermediate layer having conductivity (first nonmagnetic conductive layer) 65a, an adjustment layer 65b and a conductive cap layer having conductivity (second nonmagnetic conductive layer) 65c, and is formed by stacking these layers in order from the main magnetic pole 60 side to the trailing shield 62 side, that is, by stacking these layers in order in a traveling direction D of the magnetic head. The intermediate layer 65a, the adjustment layer 65b and the conductive cap layer 65c have surfaces which are parallel to the shield side end surface 60c of the main magnetic pole 60, that is, film surfaces which extend in a direction crossing the ABS 43, respectively.

The intermediate layer 65a, the adjustment layer 65b and the conductive cap layer 65c are not necessarily stacked in the above-described direction but may be stacked in the opposite direction, that is, from the trailing shield 62 side to the main magnetic pole 60 side.

Further, as shown in FIG. 6, a protective layer 68 is provided on the ABS 43 of the recording head 58 which includes the main magnetic pole 60, the magnetic flux control layer 65 and the trailing shield 62.

The intermediate layer 65a can be formed of a metal layer of, for example, Cu, Au, Ag, Al, Ir or NiAl alloy and can be formed of a material which does not prevent spin conduction. The intermediate layer 65a is directly formed on the shield side end surface 60c of the main magnetic pole 60. The adjustment layer 65b includes a magnetic material including at least one of iron, cobalt and nickel. For example, an alloy material in which at least one of Al, Ge, Si, Ga, B, C, Se, Sn and Ni is added to FeCo, at least one material selected from an artificial lattice group consisting of Fe/Co, Fe/Ni and Co/Ni, and the like can be used as the adjustment layer. The thickness of the adjustment layer can be, for example, 2 to 20 nm. A material which is nonmagnetic metal and blocks spin conduction can be used as the conductive cap layer 65c. The conductive cap layer 65c can be formed of, for example, at least one of Ta, Ru, Pt, W, Mo and Ir or alloy of at least one of Ta, Ru, Pt, W, Mo and Ir. The conductive cap layer 65c is directly formed on the leading side end surface 62b of the trailing shield 62. Further, the conductive cap layer can be a single layer or multiple layers.

The intermediate layer 65a has a thickness enough for transmitting a spin torque from the main magnetic pole 60 and sufficiently reducing exchange interaction, for example, a thickness of 1 to 5 nm. The conductive cap layer 65c has a thickness enough for blocking a spin torque from the trailing shield 62 and sufficiently reducing exchange interaction, for example, a thickness of 1 nm or more.

Since the direction of magnetization of the adjustment layer 65b needs to be made opposite to the direction of a magnetic field by a spin torque from the main magnetic pole 60, the saturation magnetic flux density of the adjustment layer 65b should preferably be low. On the other hand, to block the magnetic flux in effect by the adjustment layer 65b, the saturation magnetic flux density of the adjustment layer 65b should preferably be high. Since the magnetic field of the write gap WG is about 10 to 15 kOe, even if the saturation magnetic flux density of the adjustment layer 65b is about 1.5 T or more, the effect of improvement is not likely to increase. Therefore, the saturation magnetic flux density of the adjustment layer 65b should preferably be 1.5 T or less, more specifically, the adjustment layer 65b should preferably be formed such that the product of the thickness and the saturation magnetic flux density becomes 20 nm T or less.

To concentrate the flow of current in a direction perpendicular to the surfaces of the intermediate layer 65a, the adjustment layer 65b and the conductive cap layer 65c, the periphery of the magnetic flux control layer 65 is covered with an insulating layer, for example, the protective insulating film 76 except for a portion thereof which is in contact with the main magnetic pole 60 and the trailing shield 62.

The main magnetic pole 60 can be formed of a soft magnetic metal alloy including FeCe alloy as a main component. The main magnetic pole 60 also functions as an electrode for applying current to the intermediate layer 65a. The trailing shield 62 can be formed of a soft magnetic metal alloy including FeCo alloy as a main component. The trailing shield 62 also functions as an electrode for applying current to the conductive cap layer 65c.

The protective layer 68 is provided for protecting the ABS, is formed of one material or two or more materials, and is composed of a single layer or multiple layers. The protective layer has a surface layer formed of, for example, diamond-like carbon.

Further, an underlayer formed of, for example, Si or the like can be provided between the ABS 43 of the recording head 58 and the protective layer 68.

Still further, an underlayer can also be provided between the main magnetic pole 60 and the intermediate layer 65a. For example, metal such as Ta or Ru can be used as the underlayers. The thickness of the underlayers can be, for example, 0.5 to 10 nm. The thickness of the underlayers can be about 2 nm.

Still further, a cap layer can be provided between the trailing shield 62 and the conductive cap layer 65c.

At least one nonmagnetic element selected from a group consisting of Cu, Ru, W and Ta can be used as the cap layer. The thickness of the cap layer can be, for example, 0.5 to 10 nm. The thickness of the cap layer can be about 2 nm.

Other than those above, CoFe can be used as a spin polarization layer between the main magnetic pole and the intermediate layer.

As shown in FIG. 3, the main magnetic pole 60 and the trailing shield 62 are connected to a power supply 74 via a wiring line 66, power supply terminals 70 and 21 and a voltage controller 79, and a current circuit which supplies a current Iop from the power supply 74 through the wiring line 66, the voltage controller 79, the magnetic flux control layer 65 and the trailing shield 62 in series is thereby constituted. The voltage controller 79 controls voltage which is applied to the magnetic flux control layer 65.

For example, the recording coil 64 is wound around the connecting portion 50 between the main magnetic pole 60 and the trailing shield 62. The recording coil 64 is connected to a terminal 78 via a wiring line 77, and a second power supply 80 is connected to the terminal 78. A recording current Iw supplied from the second power supply 80 to the recording coil 64 is controlled by a controller (not shown) of the HDD. When a signal is written to the magnetic disk 16, a predetermined recording current Iw is supplied from the second power supply 80 to the recording coil 64, a magnetic flux is caused to flow into the main magnetic pole 60, and a recording magnetic field is generated. The controller of the HDD can include the above-described voltage controller 79.

According to the HDD constituted as described above, when the VCM 24 is driven, the carriage assembly 22 is rotated, and the magnetic head 17 is moved to and is positioned on a desired track of the magnetic disk 16. Further, as shown in FIG. 2, the magnetic head 17 is floated by the airflow C which is generated between the disk surface and the ABS 43 by the rotation of the magnetic disk 16. When the HDD is operated, the ABS 43 of the slider 42 faces the disk surface while being spaced apart from the disk surface. In this state, recorded information is read from the magnetic disk 16 by the reproducing head 54 and information is written to the magnetic disk 16 by the recording head 58.

Figure 7:
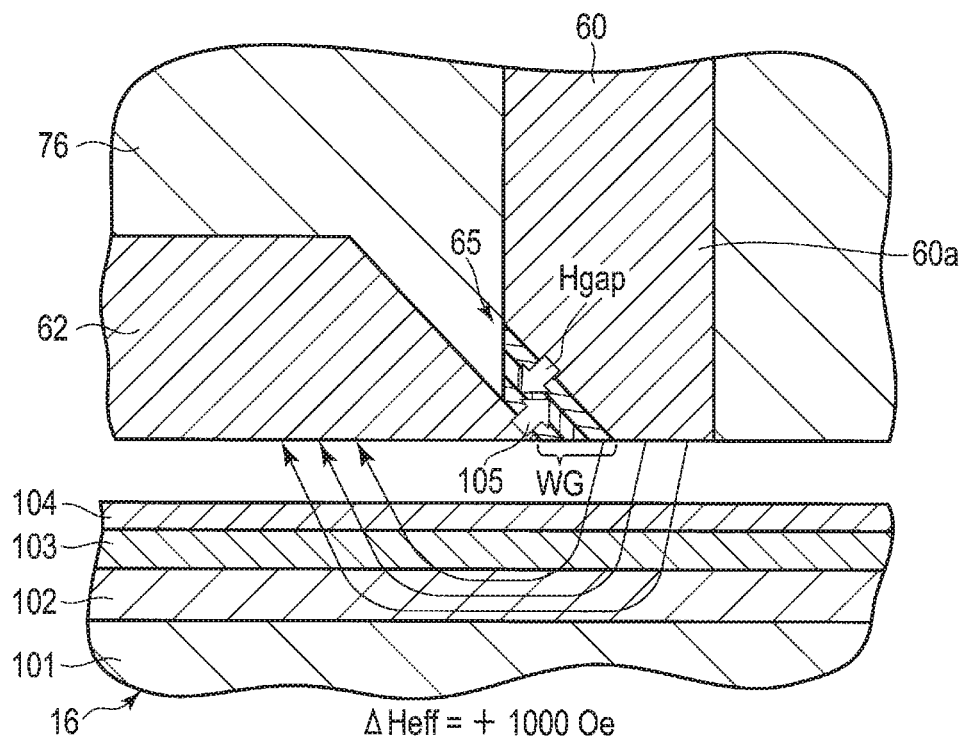
FIG. 7 is a schematic view showing a generated magnetic field of the recording head.

FIG. 7 schematically shows a state of magnetization in the write gap WG when the magnetic flux control layer 65 functions.

When the above-described information is written, as shown in FIGS. 3 to 7, alternating current is supplied from the power supply 80 to the recording coil 64, the main magnetic pole 60 is excited by the recording coil 64, and a perpendicular recording magnetic field is applied from the main magnetic pole 60 to a recording layer 103 of the magnetic disk 16 immediately under the main magnetic pole 60. Information is thereby recorded at a desired track width on the magnetic recording layer 103.

Further, when the recording magnetic field is applied to the magnetic disk 16, the current Iop is applied from the power supply 74 through the wiring line 66, the main magnetic pole 60, the magnetic flux control layer 65 and the trailing shield 62. When the current is applied, a spin torque acts on the adjustment layer 65b of the magnetic flux control layer 65 from the main magnetic pole 60, and as indicated by an arrow 105, the direction of magnetization of the adjustment layer 65b is made opposite to the direction of a magnetic field (gap magnetic field) Hgap which is generated between the main magnetic pole 60 and the trailing shield 62. According to this magnetization inversion, the adjustment layer 65b produces the effect of blocking the magnetic flux (gap magnetic field Hgap) which directly flows from the main magnetic pole 60 to the trailing shield 62. Here, the effect is referred to as an assist effect. As a result, the magnetic field leaking from the main magnetic pole 60 to the write gap WG is reduced, and the degree of convergence of the magnetic flux from the distal end portion 60a of the main magnetic pole 60 to the magnetic recording layer 103 of the magnetic disk 16 is increased. Accordingly, the resolution of the recording magnetic field is improved, and track recording density can be increased.

According to the first embodiment constituted as described above, in the recording head 58, the magnetic flux control layer 65 provided in the write gap WG prevents a direct flow of a magnetic flux from the main magnetic pole 60 to the trailing shield 62 and makes the magnetic permeability of the gap negative in effect. More specifically, the magnetic flux control layer 65 is provided between the main magnetic pole 60 and the trailing shield 62, and is configured to make the direction of magnetization opposite to the direction of the gap magnetic field by a spin torque. Therefore, it is possible to direct the magnetic flux leaking from the main magnetic pole 60 to the trailing shield 62 toward the magnetic disk (recording medium) 16 while keeping the write gap WG narrow.

Further, according to the first embodiment, to secure long-term reliability, a voltage Vb applied to the magnetic flux control layer is set to be lower than a voltage Vba given by the following expression (1).

$$Vba = Vb_0 - a \times 1/\log(t) \times \log(RH) \times \log(P_{O2}) \quad (1)$$

where $Vb_0$ is the maximum voltage applicable to the magnetic flux control layer, t is the thickness (nm) of the protective film, RH is the relative humidity of the atmosphere in the device, $P_{O2}$ is the oxygen partial pressure (Pa) of the atmosphere in the device, and a is the coefficient of the device.

According to the embodiment, the supply current of the magnetic flux control layer, the protective layer of the magnetic head, and the number of oxygen atoms remaining in the HDD are determined by the above-described relational expression (1). As a result, the binding between the magnetic material as the main component of the magnetic flux control layer and oxygen in the ambient atmosphere of the magnetic recording head can be prevented, and long-term reliability can be secured. If the number of oxygen atoms is about the same as that of air, it is possible to prevent oxidation of the magnetic flux control layer and to secure reliability by increasing the thickness of the protective layer or reducing the supply current. On the other hand, if the number of oxygen atoms is small, it is possible to realize high recording density by reducing the thickness of the protective layer or increasing the supply current.

The applied voltage Vb should preferably be 100 to 300 mV. If the applied voltage Vb is less than 100 mV, the assist effect by the spin transfer torque decreases significantly, and the write performance tends to be insufficient. If the applied voltage Vb exceeds 300 mV, the failure rate of the magnetic flux control layer tends to increase significantly.

The thickness of the protective layer can be 1.0 to 2.5 nm. If the thickness is less than 1.0 nm, the progress of the oxidation reaction of the magnetic flux control layer is promoted, and the failure rate tends to increase. If the thickness exceeds 2.5 nm, the distance between the magnetic head and the recording medium is too large, and the write performance tends to deteriorate.

The relative humidity of the atmosphere in the HDD should preferably be 80% or less. If the relative humidity exceeds 80%, the progress of the oxidation reaction of the magnetic flux control layer is promoted, and the write performance tends to deteriorate.

Assuming that the pressure of all gases is 100%, the oxygen partial pressure should preferably be 20% or less. If the oxygen partial pressure exceeds 20%, the progress of the oxidation reaction of the magnetic flux control layer is promoted, and the write performance tends to deteriorate.

Figure 8:
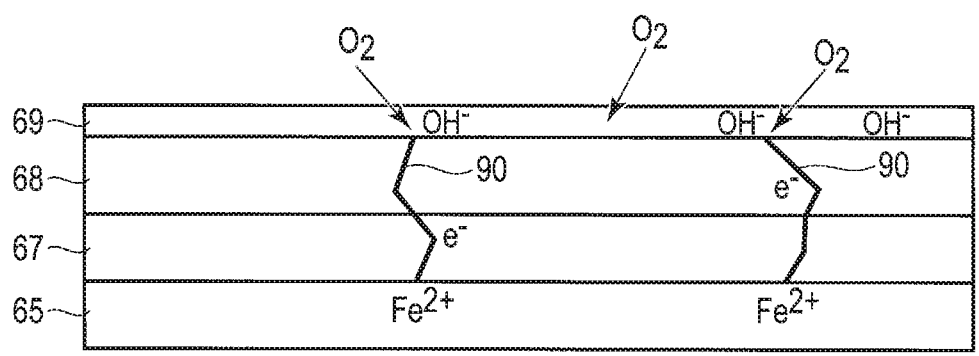
FIG. 8 is a schematic view showing a mechanism for the oxidation of a magnetic flux control layer.

FIG. 8 schematically shows a mechanism for the oxidation of the magnetic flux control layer.

As shown in the drawing, when the protective layer 68 formed of diamond-like carbon is provided on the ABS of the magnetic flux control layer 65 via, for example, a Si underlayer 67, a thin film 69 made of moisture in the atmosphere is formed on the surface of the protective layer 68. In a general mechanism for oxidation, when the protective layer 68 has pinholes 90, oxygen $O_2$ in the HDD is dissolved into moisture on the surface of the protective layer 68, electrons $e^-$ reach the magnetic flux control layer 65 via the pinholes 90 and react with iron ions $Fe^{2+}$ in the magnetic flux control layer 65, and the oxidation reaction of iron occurs. The oxidation reaction is promoted in a case where the amount of oxygen in the HDD which is a reacting specifies is large, a case where the number of iron atoms exceeding the potential energy of oxidation reaction increases as the temperature increases at the time of current supply to the magnetic flux control layer, a case where the thickness of the protective layer is small and the number of pinholes is large, and the like. In the magnetic recording head using the magnetic flux control layer, it is necessary to secure long-term reliability by appropriately controlling these parameters.

Example 1

A method of manufacturing an assisted magnetic recording head according to the first embodiment will be described below.

First, layers formed of the following materials and having the following thicknesses were stacked in order by DC magnetron sputtering on the main magnetic pole which was mainly formed of FeCo.

Spin polarization layer CoFe 3 nm
Intermediate layer Cu 2 nm
Adjustment layer 1 FeCo 1 nm
Adjustment layer 2 NiFe 9 nm
Conductive cap layer Ru/Ta/Ru 2/2/1 nm A mask layer for defining the size of the magnetic flux control layer in a stripe height direction was formed, and the magnetic flux control layer was etched by ion beam etching (IBE) until the main magnetic pole was exposed. SiOx as an insulating film was formed in the periphery of the magnetic flux control layer, and the mask layer was removed. Further, a mask layer for defining the size in the track width direction was formed, and similarly, etching was performed, SiOx as an insulating film was formed in the periphery of the element, and the magnetic flux control layer was thereby processed.

Next, NiFe was formed as the trailing shield on the conductive cap layer.

Subsequently, a Si underlayer having a thickness of about 1 nm was formed on the main magnetic pole, the magnetic flux control layer, the trailing shield and the insulating film on the ABS side by sputtering, a protective layer formed of diamond-like carbon and having a thickness of 1.6 nm was formed on the Si underlayer by CVD, and a magnetic recording head was thereby obtained. Similarly, 20 magnetic recording heads each having a protective layer having a thickness of 1.6 nm on the ABS side were manufactured in total.

The structure of the obtained magnetic recording head is similar to the structure of FIGS. 5 and 6 except that the adjustment layer of the magnetic flux control layer is divided into an adjustment layer 1 (not shown) and an adjustment layer 2 (not shown) and a spin polarization layer is provided between the main magnetic pole 60 and the intermediate layer.

20 more magnetic recording heads were manufactured similarly except that the thickness of the protective layer on the ABS side was changed to 2.0 nm, and 20 more magnetic recording heads were manufactured similarly except that the thickness of the protective layer on the ABS side was changed to 2.4 nm.

The manufactured magnetic recording head was installed, air having a humidity of 20% (oxygen partial pressure of 19%) was sealed in, and an HDD was thereby manufactured.

As a long-term current supply test, at an environmental temperature of 55° C., current was continuously supplied to the magnetic control layer for 800 hours at various applied voltages of 50, 100, 150, 200, 250 and 300 mV. The resistance was measured before the current supply test and after the current supply test by a preamplifier connected in the HDD, and the resistances were compared with each other. The ratio of the resistance after the current supply test to the resistance before the current supply test was defined as a change rate, the HDD was counted as normal if the change rate was 3% or less and was counted as failure if the change rate was more than 3%, and the ratio of the number of failures to the total number was defined as a failure rate (%).

Further, before the long-term current supply test, the signal-to-noise ratio (SNR) was measured with a standard medium, and the write performance of the head was evaluated. In the SNR measurement, the manufactured magnetic recording head was incorporated, air having a humidity of 20% (oxygen partial pressure of 19570 Pa (oxygen concentration of 19%)) was sealed in, and the HDD was manufactured. The test was carried out at a temperature of 20° C. The result was the average value of 20 heads, and the pattern for the SNR measurement was a high-frequency pattern.

The failure rate was evaluated as an S rank in the case of 50% or less, was evaluated as an A rank in the case of 80% or less, was evaluated as a B rank in the case of 90% or less, and was evaluated as a C rank in the other case.

The SNR was evaluated as an S rank in the case of 2.5 dB or more, was evaluated as an A rank in the case of 2.0 dB or more, was evaluated as a B rank in the case of 1.5 dB or more, and was evaluated as a C rank in the other case.

The obtained result is shown in the following table 1.

TABLE 1

| Test | Thickness of protective layer (nm) | Vb (mV) | Failure rate (%) and evaluation | SNR (dB) and evaluation | Vba | Coefficient a |
|---|---|---|---|---|---|---|
| 1-1 | 1.6 | 50 | 80 (B) | 0.6 (C) | 76 | 40 |
| 1-2 | 1.6 | 100 | 100 (C) | 1.8 (B) | 76 | 40 |
| 1-3 | 1.6 | 150 | 100 (C) | 2.2 (A) | 76 | 40 |
| 1-4 | 1.6 | 200 | 100 (C) | 2.4 (A) | 76 | 40 |
| 1-5 | 1.6 | 250 | 100 (C) | 2.6 (S) | 76 | 40 |
| 1-6 | 1.6 | 300 | 100 (C) | 2.8 (S) | 76 | 40 |
| 1-7 | 2.0 | 50 | 2 (S) | 0.4 (C) | 180 | 40 |
| 1-8 | 2.0 | 100 | 30 (S) | 1.6 (B) | 180 | 40 |
| 1-9 | 2.0 | 150 | 70 (A) | 2.0 (A) | 180 | 40 |
| 1-10 | 2.0 | 200 | 95 (C) | 2.2 (A) | 180 | 40 |
| 1-11 | 2.0 | 250 | 100 (C) | 2.5 (S) | 180 | 40 |
| 1-12 | 2.0 | 300 | 100 (C) | 2.6 (S) | 180 | 40 |
| 1-13 | 2.4 | 50 | 0 (S) | 0.3 (C) | 226 | 40 |
| 1-14 | 2.4 | 100 | 0 (S) | 1.3 (C) | 226 | 40 |
| 1-15 | 2.4 | 150 | 5 (S) | 1.8 (B) | 226 | 40 |
| 1-16 | 2.4 | 200 | 28 (S) | 2.0 (A) | 226 | 40 |
| 1-17 | 2.4 | 250 | 60 (C) | 2.3 (A) | 226 | 40 |
| 1-18 | 2.4 | 300 | 100 (C) | 2.4 (A) | 226 | 40 |

FIG. 9 is a graph showing the relationship between the voltage applied to the magnetic flux control layer and the failure rate when the thickness of the protective layer in the magnetic recording head having the magnetic flux control layer is changed.

Here, the thickness of the protective layer is defined as the distance from the surface of the magnetic flux control layer to the surface of the protective layer.

In the drawing, a graph 201 shows a case where the thickness of the protective layer is 1.6 nm, a graph 202 shows a case where the thickness of the protective layer is 2.0 nm, and a graph 203 shows a case where the thickness of the protective layer is 2.4 nm.

As shown in the drawing, the failure rate increases as the applied voltage Vb increases. This is because, when the applied voltage Vb increases, Joule heat increases and the magnetic flux control layer generates heat, and the oxidation reaction is thereby promoted. On the other hand, when the thickness of the protective layer is large, the number of oxygen atoms supplied from pinholes is small. Therefore, even if the applied voltage Vb is high, the failure rate is low. If the thickness of the protective layer is determined according to an HDI design which secures reliability based on these relationships, the applicable voltage Vb will be determined, accordingly.

The following expression (1) is a mathematical expression of the maximum voltage Vba which can secure long-term reliability required for one magnetic head based on these relationships.

$$Vba = Vb_0 - a \times 1/\log(t) \times \log(RH) \times \log(P_{O2}) \quad (1)$$

where $Vb_0$ is the maximum voltage applicable to the magnetic flux control layer, t is the thickness (nm) of the protective film, RH is the relative humidity, $P_{O2}$ is the oxygen partial pressure (Pa) of the atmosphere in the device, and a is the coefficient of the device.

It is known that the applicable voltage of the magnetic flux control layer is directly proportional to the thickness of the protective layer and is indirectly proportional to the logarithm of the humidity and the logarithm of the oxygen partial pressure. Accordingly, the required applied voltage Vba can be represented by the above-described expression (1).

The voltage Vba and the coefficient a are also shown in the above table 1.

From the above result, no condition can balance the failure rate and the SNR when the thickness of the protective layer is 1.6 nm, and the applied voltage of the magnetic flux control layer should preferably be 100 to 150 mV when the thickness of the protective film is 2.0 nm and should preferably be 100 to 200 mV when the thickness of the protective film is 2.4 nm.

Example 2

A long-hour current supply test was carried out at various applied voltages and failure rates were obtained similarly to the example 1 except that the thickness of the protective layer was 2.0 nm and the oxygen partial pressure of the air introduced into the HDD was changed between 5150 Pa (oxygen concentration of 5%), 19570 Pa (oxygen concentration of 19%) and 41200 Pa (oxygen concentration of 40%).

The obtained result, the voltage Vba and the coefficient a are shown in the following table 2.

TABLE 2

| Test | Oxygen partial pressure (Pa) | Vb (mV) | Failure rate (%) and evaluation | Vba | Coefficient a |
|---|---|---|---|---|---|
| 2-1 | 5150 | 50 | 0 | 279 | 40 |
| 2-2 | 5150 | 100 | 0 | 279 | 40 |
| 2-3 | 5150 | 150 | 13 | 279 | 40 |
| 2-4 | 5150 | 200 | 31 | 279 | 40 |
| 2-5 | 5150 | 250 | 50 | 279 | 40 |
| 2-6 | 5150 | 300 | 68 | 279 | 40 |
| 2-7 | 5150 | 400 | 100 | 279 | 40 |
| 2-8 | 19570 | 50 | 2 | 180 | 40 |
| 2-9 | 19570 | 100 | 30 | 180 | 40 |
| 2-10 | 19570 | 150 | 70 | 180 | 40 |
| 2-11 | 19570 | 200 | 95 | 180 | 40 |
| 2-12 | 19570 | 250 | 100 | 180 | 40 |
| 2-13 | 19570 | 300 | 100 | 180 | 40 |
| 2-14 | 19570 | 400 | 100 | 180 | 40 |
| 2-15 | 41200 | 50 | 4 | 125 | 40 |
| 2-16 | 41200 | 100 | 58 | 125 | 40 |
| 2-17 | 41200 | 150 | 100 | 125 | 40 |
| 2-18 | 41200 | 200 | 100 | 125 | 40 |
| 2-19 | 41200 | 250 | 100 | 125 | 40 |
| 2-20 | 41200 | 300 | 100 | 125 | 40 |
| 2-21 | 41200 | 400 | 100 | 125 | 40 |

Further, FIG. 10 is a graph showing the relationship between the applied voltage and the failure rate when the number of oxygen atoms remaining in the HDD is changed.

In the drawing, a graph 204 shows a case where the oxygen partial pressure is 40530 Pa (oxygen concentration of 40%), a graph 205 shows a case where the oxygen partial pressure is 19251.75 Pa (oxygen concentration of 19%), and a graph 206 shows a case where the oxygen partial pressure is 5166.25 Pa (oxygen concentration of 5%).

Similarly to FIG. 9, FIG. 10 shows that, when the applied voltage increases, Joule heat increases and the failure rate increases, accordingly. Further, if the number of oxygen atoms remaining in the HDD is large, the number of oxygen atoms which react with the magnetic flux control layer is large, and the slope of the failure rate with respect to the low applied voltage will be large, and if the number of oxygen atoms is small, the slope will be small. Note that the number of remaining oxygen atoms was calculated from the pressure of all gases in the HDD.

Figure 11:
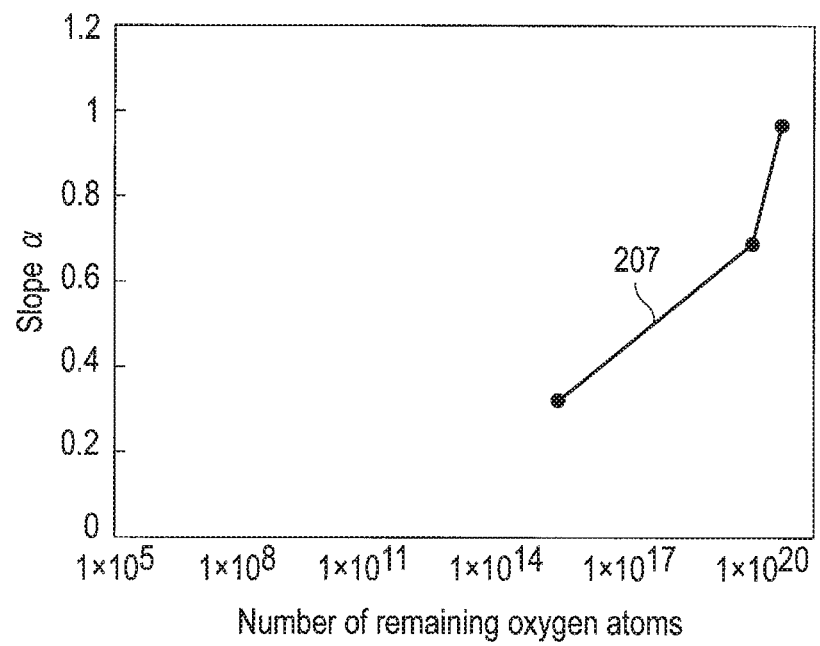
FIG. 11 is a graph showing the relationship between the number of oxygen atoms remaining in the HDD and a slope $\alpha$.

Assuming that the slope for the failure rate and the applied voltage in FIG. 10 is a, a graph of the relationship between the number of oxygen atoms remaining in the HDD and the slope α is shown in FIG. 11.

As shown in a graph 207, when the number of remaining oxygen atoms decreases, the slope α decreases and the increase of the failure rate with respect to the applied voltage is moderated. When the number of remaining oxygen atoms decreases, the probability of the oxygen atoms reaching the magnetic flux control layer via pinholes decreases, and the failure rate decreases, accordingly. When this slope is extrapolated, if the number of oxygen atoms remaining in the HDD is 108 to 105 or less, the slope α is 0 and the failure rate is 0% from the perspective of oxidation of the magnetic flux control layer. From the above, the voltage applicable to the magnetic flux control layer can be determined by the number of oxygen atoms remaining in the HDD, the assisted recording head can be used to its full potential.

Example 3

As described in the example 1, the SNR improves as the voltage Vb increases. However, heat is also generated, and reliability is degraded as a result. Even when the voltage Vb is not applied (current is not supplied) or when the material of the magnetic flux control layer is slightly different from that of the example 1, heat has an impact on reliability similarly. Therefore, a test for the optimal operation temperature of the magnetic recording head comprising the magnetic flux control layer was carried out.

A plurality of magnetic recording heads were prepared similarly to the example 1. Here, the thickness of protective layers thereof was 2.0 nm.

The HDD with the magnetic flux control layer head was put in a constant temperature bath and the SNR was measured at room temperature. Subsequently, the temperature of the constant temperature bath was set at 5° C. to 200° C., and as the assisted recording operation test, an assisted recording operation was carried out for a total of 20 hours by continuously supplying current to the magnetic flux control layer at the respective temperatures. Although the recording time was 20 hours, the HDD was placed at the temperature in the constant temperature bath for a total of 50 hours. Subsequently, the device was removed from the constant temperature bath, and the SNR was measured again after the temperature returned to room temperature. It was confirmed that the SNRs of heads placed at high temperature decreased. When these heads were observed by an electron microscope, a large number of oxidation products from the magnetic flux control layer were deposited on the protective layer.

Figure 12:
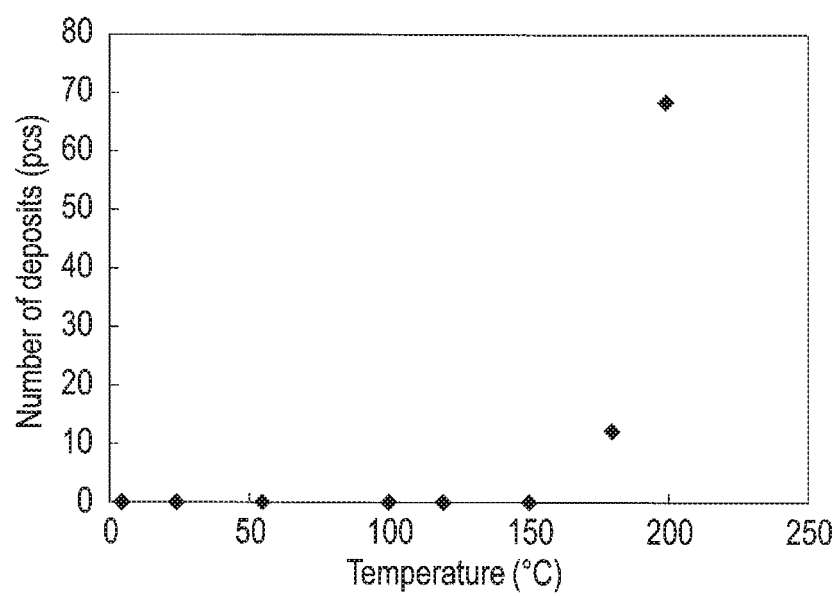
FIG. 12 is a graph showing the relationship between the temperature and the number of deposits.

FIG. 12 is a graph showing the relationship between the temperature and the number of deposits.

Regarding several magnetic recording heads, the average number of deposited oxide products per 1 mm² was counted and plotted in FIG. 12. At high temperature, the deposition from pinholes was promoted, the distance between the head and the medium was increased by the deposition, and the SNR was degraded as a result. The obtained result is shown in the following table 3.

TABLE 3

| Test | Temperature (° C.) | ΔSNR (dB) | Evaluation |
| --- | --- | --- | --- |
| 3-1 | 5 | 0.1 | ◎ |
| 3-2 | 20 (Room temperature) | −0.1 | ◎ |
| 3-3 | 55 | 0.3 | ◎ |
| 3-4 | 100 | 0.4 | ◎ |
| 3-5 | 120 | 0.5 | ◎ |
| 3-6 | 150 | 0.8 | ○ |
| 3-7 | 180 | 2.1 | Δ |
| 3-8 | 200 | 3.6 | Δ |

In the table, ΔSNR is evaluated as a double circle (◎) in the case of 0.5 dB or less, is evaluated as a circle (○) in the case of 1.0 dB or less, and is evaluated as a triangle (Δ) in the case of 1.1 dB or more.

The above result shows that the optical operation temperature is 5 to 150° C., more preferably, 5 to 120° C.

Example 4

Humidity is an important factor in the oxidation of the magnetic flux control layer. When the humidity increases, a thin film of water is formed on the surface of a material, and oxidation tends to occur as a result. In the example 4, an HDD was manufactured similarly to the example 1 except that a magnetic recording head comprising a protective layer having a thickness of 2.0 nm was employed and the humidity of sealed-in air was changed. Here, the humidity is defined as relative humidity U (% RH) at a room temperature of 20° C. which is derived from an expression (2) represented as U (% RH)=e/es×100 using water vapor pressure e (Pa) and saturation vapor pressure es (Pa).

The voltage applied to the magnetic flux control layer was 0 to 300 mV, and after the assisted recording operation was performed for a total of 50 hours by continuously supplying current to the magnetic flux control layer, the SNR was measured. A standard medium was used as a medium. The difference between the initial SNR immediately after the operation of the assisted recording operation test at the voltage of 200 mV (Vb=200 mV) started and the SNR after the operation was performed for 100 hours is shown in the following table 4. Further, the calculated value of the voltage Vba is also shown.

TABLE 4

| Test | Humidity (%) | ΔSNR (before and after recording operation) (dB) | Evaluation | Vb (mV) | Vba |
| --- | --- | --- | --- | --- | --- |
| 4-1-1 | 5 | 0.1 | ◎ | 200 | 281 |
| 4-1-2 | 20 | −0.1 | ◎ | 200 | 227 |
| 4-1-3 | 40 | 0.2 | ◎ | 200 | 207 |
| 4-1-4 | 60 | 0.3 | ◎ | 200 | 196 |
| 4-1-5 | 80 | 0.7 | ○ | 200 | 193 |
| 4-1-6 | 100 | 2.8 | Δ | 200 | 188 |

After the SNR measurement, the head was taken apart and the number of oxide deposits per 1 mm² of protective layer surface was counted.

Regarding the obtained result, ΔSNR, which is an amount of deterioration of the SNR, is evaluated as a double circle (◎) in the case of 0.5 dB or less, is evaluated as a circle (○)

in the case of 1.0 dB or less, and is evaluated as a triangle (Δ) in the case of 1.1 dB or more.

Further, the applied voltage Vb, the number of deposits, the voltage Vba and the coefficient a when the humidity is changed are shown in the following table 5.

TABLE 5

| Test | Humidity (%) | Vb (mV) | Number of deposits | Vba | Coefficient a |
|---|---|---|---|---|---|
| 4-2-1 | 20 | 50 | 0 | 227 | 31 |
| 4-2-2 | 20 | 100 | 0 | 227 | 31 |
| 4-2-3 | 20 | 150 | 0 | 227 | 31 |
| 4-2-4 | 20 | 200 | 0 | 227 | 31 |
| 4-2-5 | 20 | 250 | 0 | 227 | 31 |
| 4-2-6 | 20 | 300 | 7 | 227 | 31 |
| 4-2-7 | 60 | 50 | 0 | 196 | 27 |
| 4-2-8 | 60 | 100 | 1 | 196 | 27 |
| 4-2-9 | 60 | 150 | 2 | 196 | 27 |
| 4-2-10 | 60 | 200 | 3 | 196 | 27 |
| 4-2-11 | 60 | 250 | 5 | 196 | 27 |
| 4-2-12 | 60 | 300 | 7 | 196 | 27 |
| 4-2-13 | 100 | 50 | 3 | 188 | 25 |
| 4-2-14 | 100 | 100 | 5 | 188 | 25 |
| 4-2-15 | 100 | 150 | 8 | 188 | 25 |
| 4-2-16 | 100 | 200 | 12 | 188 | 25 |
| 4-2-17 | 100 | 250 | 20 | 188 | 25 |
| 4-2-18 | 100 | 300 | 30 | 188 | 25 |

Figure 13:
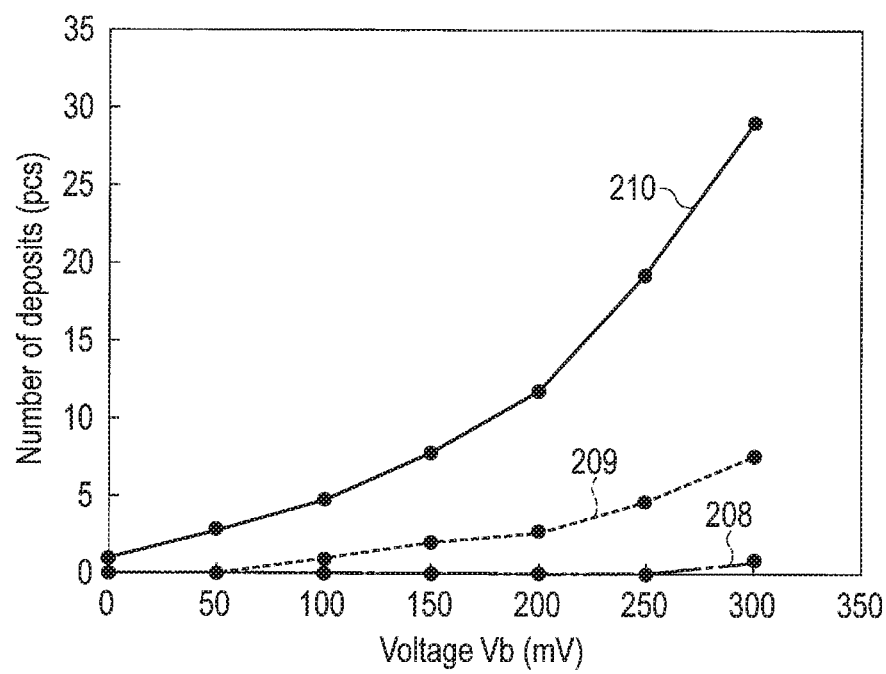
FIG. 13 is a graph showing the relationship between the applied voltage and the number of deposits when the humidity is changed.

FIG. 13 is a graph showing the relationship between the applied voltage and the number of deposits when the humidity is changed.

In the drawing, a graph 208 shows a case where the relative humidity is 20%, a graph 209 shows a case where the relative humidity is 60%, and a graph 210 shows a case where the relative humidity is 100%.

FIG. 13 shows that, when the relative humidity is 60%, the number of deposited oxidation products gradually increases with respect to the applied voltage Vb. On the other hand, when the relative humidity is 100%, the increase of the number of deposits is highly dependent on the applied voltage Vb. As also shown in the table 4, the SNR is considerably degraded when the relative humidity is 100%. From the result, the relative humidity in the device should be 80% or less, more preferably, 60% or less.

Example 5

The influence of the oxygen partial pressure on the oxidation of the magnetic flux control layer was examined.

An HDD was manufactured similarly to the example 1 except that oxygen was mixed with helium at a certain concentration and was sealed in the HDD instead of air and a magnetic recording head comprising a protective layer having a thickness of 2.0 nm was employed. A standard medium was used in the HDD. The oxygen partial pressure in the total pressure of the HDD was 0 to 50662.5 Pa (oxygen concentration of 50%). Water vapor was mixed with oxygen such that the humidity would be 20%. The other gas was pure helium.

The SNR of the obtained HDD was measured. Subsequently, the voltage applied to the magnetic flux control layer was 0 to 300 mV, and an assisted recording operation test was performed for a total of 50 hours by continuously supplying current to the magnetic flux control layer, the SNR was measured, and the change of the SNR before and after the assisted recording operation test was examined. The difference between the SNR immediately after the operation was started and the SNR after the operation was performed for 200 hours, and the voltage Vba in the test at the voltage Vb of 200 mV (Vb=200 mV) are shown in the following table 6.

TABLE 6

| Test | Oxygen partial pressure (Pa) | ΔSNR (before and after recording operation) (dB) | Evaluation | Vb (mV) | Vba |
|---|---|---|---|---|---|
| 5-1-1 | 0 | 0.1 | ⊚ | 200 | 914 |
| 5-1-2 | 10132.5 | 0.3 | ⊚ | 200 | 229 |
| 5-1-3 | 20265 | 0.6 | ○ | 200 | 177 |
| 5-1-4 | 30397.5 | 1.2 | Δ | 200 | 147 |
| 5-1-5 | 40530 | 2.1 | Δ | 200 | 126 |
| 5-1-6 | 50662.5 | 3.2 | Δ | 200 | 109 |

After the SNR measurement, the head was taken apart and the number of deposits per 1 mm$^2$ of protective layer surface was counted.

The applied voltage Vb, the number of deposits, the SNR, the coefficient a and the voltage Vba when the oxygen partial pressure was changed are shown in the following table 7.

TABLE 7

| Test | Oxygen partial pressure (Pa) | Vb (mV) | Number of deposits | Vba | Coefficient a |
|---|---|---|---|---|---|
| 5-2-1 | 5166.25 | 50 | 0 | 292 | 40 |
| 5-2-2 | 5166.25 | 100 | 0 | 292 | 40 |
| 5-2-3 | 5166.25 | 150 | 0 | 292 | 40 |
| 5-2-4 | 5166.25 | 200 | 0 | 292 | 40 |
| 5-2-5 | 5166.25 | 250 | 1 | 292 | 40 |
| 5-2-6 | 5166.25 | 300 | 3 | 292 | 40 |
| 5-2-7 | 20265 | 50 | 3 | 201 | 40 |
| 5-2-8 | 20265 | 100 | 6 | 201 | 40 |
| 5-2-9 | 20265 | 150 | 10 | 201 | 40 |
| 5-2-10 | 20265 | 200 | 14 | 201 | 40 |
| 5-2-11 | 20265 | 250 | 22 | 201 | 40 |
| 5-2-12 | 20265 | 300 | 50 | 201 | 40 |
| 5-2-13 | 50662.5 | 50 | 20 | 140 | 40 |
| 5-2-14 | 50662.5 | 100 | 58 | 140 | 40 |
| 5-2-15 | 50662.5 | 150 | 100 | 140 | 40 |
| 5-2-16 | 50662.5 | 200 | 178 | 140 | 40 |
| 5-2-17 | 50662.5 | 250 | 250 | 140 | 40 |
| 5-2-18 | 50662.5 | 300 | 442 | 140 | 40 |

Figure 14:
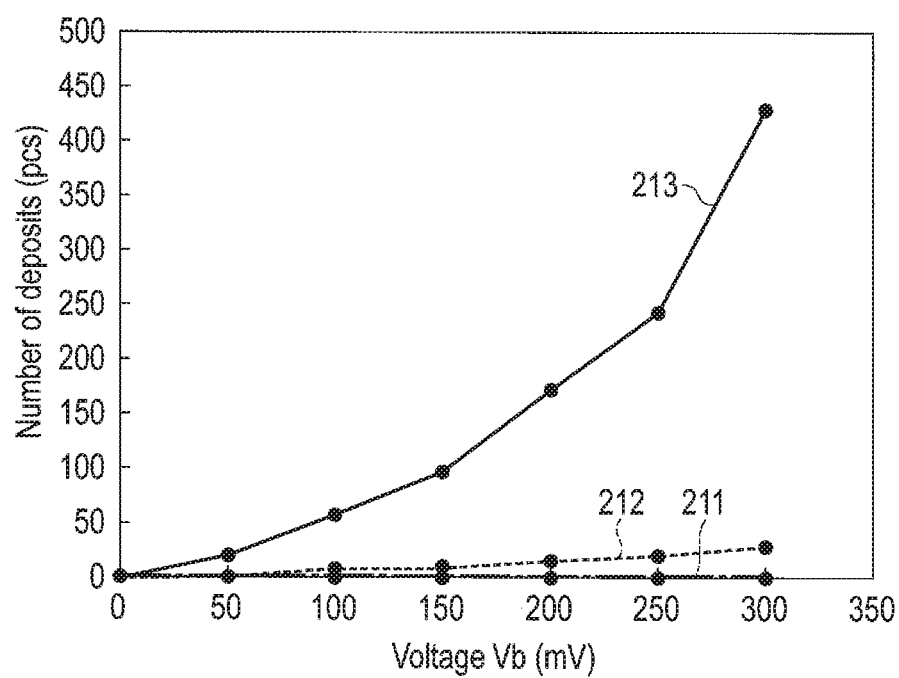
FIG. 14 is a graph showing the relationship between the applied voltage and the number of deposits when the partial pressure of oxygen is changed.

Further, a graph showing the relationship between the applied voltage Vb and the number of deposits when the oxygen partial pressure is changed is shown in FIG. 14.

In the drawing, a graph 211 shows a case where the oxygen partial pressure is 5166.25 Pa (oxygen concentration of 5%), a graph 212 shows a case where the oxygen partial pressure is 20265 Pa (oxygen concentration of 20%), and a graph 213 shows a case where the oxygen partial pressure is 50662.5 Pa (oxygen concentration of 50%).

As shown in FIG. 14, if the oxygen partial pressure is about 20265 Pa (oxygen concentration of 20%), the dependence of the number of deposits on the voltage Vb is low. On the other hand, if the oxygen partial pressure is increased to 50662.5 Pa (oxygen concentration of 50%), oxidation reaction starts at low voltage, and the number of deposits with respect to the voltage increases significantly. As also shown in the table 6, as the long-hour current supply test, when the applied voltage of 200 mV is applied, deposition of oxidation products starts when the oxygen partial pressure exceeds 10%, and the SNR difference becomes remarkable when the oxygen partial pressure is 50%.

From the above, the oxygen partial pressure in the device should be 20265 Pa (oxygen concentration of 20%) or less, more preferably, 10132.5 Pa (oxygen concentration of 10%) or less.

Comparative Example 6-1

An example of the test under an environment at high temperature and high humidity will be described.

20 magnetic recording heads were manufactured similarly to the example 1 except that the protective layer having a thickness of 2.0 nm was formed on the ABS side.

The manufactured magnetic recording head was installed, air having a humidity of 40% (oxygen partial pressure of 21278.25 Pa (0.21 atm)) was sealed in, and an HDD was thereby manufactured.

As the long-term current supply test, current was supplied to the obtained HDD for 800 hours at a voltage of 200 mV at an environmental temperature of 55° C. or less.

The resistance was measured by a preamplifier connected in the HDD before and after the current supply test, and the resistances were compared with each other.

In the comparative example 6-1, the coefficient a in the expression (1) is 42.5. If 42.5 is substituted into the expression (1), the voltage Vba is 101 mV (Vba=101 mV). The applied voltage of 200 mV is higher than the voltage Vba.

As a result of the test, the failure rate was 100%.

To examine the state of the magnetic recording head after the current supply test, the ABS of the magnetic recording head was cut along the track center, and the cross section was observed by a scanning electron microscope (SEM).

Figure 15:
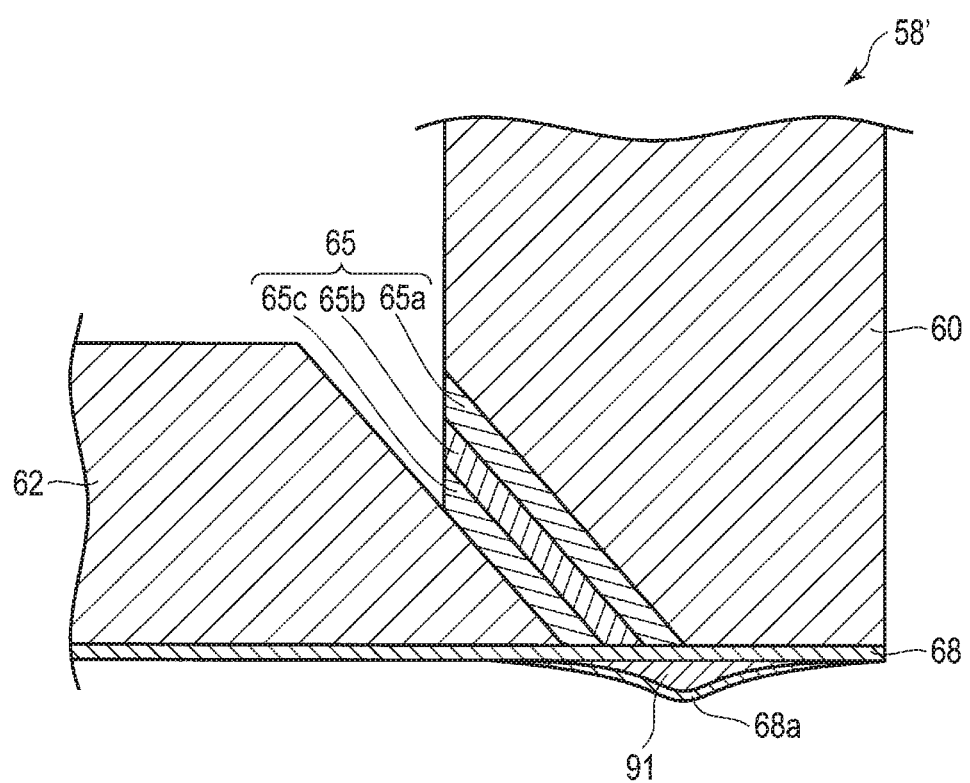
FIG. 15 is a schematic view showing a cross section of a comparative magnetic recording head.

FIG. 15 schematically shows the cross section of the comparative magnetic recording head.

As shown in the drawing, in a comparative magnetic recording head 58', an iron oxide layer 91 which is deposited in a protective layer 68 by the oxidation of iron in the magnetic flux control layer 65 pushes up and deforms a surface region 68a of the protective layer 68. As a result, the resistance to the current supply increases. Besides that, the head may contact and damage the magnetic disk.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording and reproducing device comprising:
    a rotatable disk-shaped recording medium including a magnetic recording layer; and
    a magnetic recording head which records information on the recording medium and comprises:
    an air bearing surface;
    a main magnetic pole which has a distal end portion extending to the air bearing surface and generates a perpendicular recording magnetic field;
    an auxiliary magnetic pole which faces the distal end portion of the main magnetic pole across a write gap and constitutes a magnetic core with the main magnetic pole;
    a magnetic flux control layer which includes a first conductive layer provided on the main magnetic pole, an adjustment layer provided on the first conductive layer and formed of a magnetic material comprising one of iron, cobalt or nickel, and a second conductive layer electrically connecting the adjustment layer and the auxiliary magnetic pole, and generates a spin torque and inverts a direction of magnetization in the adjustment layer, when current is supplied; and
    a protective layer which is provided on the air bearing surfaces of the main magnetic pole, the magnetic flux control layer and the auxiliary magnetic pole, wherein
    a voltage Vb applied to the magnetic control layer is lower than a voltage Vba represented by an expression (1)

$$Vba = Vb_0 - a \times 1/\log(t) \times \log(RH) \times \log(P_{O2}), \quad (1)$$

where $Vb_0$ is a maximum voltage applicable to the magnetic flux control layer, t is a thickness (nm) of the protective film, RH is a relative humidity, $P_{O2}$ is an oxygen partial pressure (Pa) of an atmosphere in the device, and a is a coefficient of the device.

2. The magnetic recording and reproducing device of claim 1, wherein the protective layer has a thickness of 1.0 to 2.5 nm.

3. The magnetic recording and reproducing device of claim 1, wherein the protective layer includes a surface layer formed of diamond-like carbon.

4. The magnetic recording and reproducing device of claim 1, wherein the voltage Vb applied to the magnetic flux control layer is 100 to 300 mV.

5. The magnetic recording and reproducing device of claim 1, wherein a temperature of the magnetic flux control layer in operation is 5 to 150° C.

6. The magnetic recording and reproducing device of claim 1, wherein an ambient atmosphere of the magnetic recording head has a humidity of 80% or less when the magnetic recording head operates.

7. The magnetic recording and reproducing device of one of claims 1 to 6, wherein an ambient atmosphere of the magnetic recording head has an oxygen partial pressure of 20% or less when a pressure of whole air in the recording and reproducing device is 100%.

8. The magnetic recording and reproducing device of claim 1, further comprising a voltage controller connected to the magnetic recording head, wherein
    the voltage controller controls the voltage Vb applied to the magnetic flux control layer to be lower than the voltage Vba represented by the expression (1).

* * * * *